James V. Johnston,
INVENTOR

United States Patent Office 3,606,793
Patented Sept. 21, 1971

3,606,793
SELF-GENERATING HYDROSTATIC SUPPORT FOR GYROSCOPES
James V. Johnston, Huntsville, Ala., assignor to the United States of America as represented by the Secretary of the Army
Filed Oct. 3, 1969, Ser. No. 863,596
Int. Cl. G01c 19/20
U.S. Cl. 74—5     7 Claims

ABSTRACT OF THE DISCLOSURE

A gyroscope having a hydrostatic support for its output axis without the need for externally pressurized systems. The gyro is completely hermetically sealed against all environments to provide an internal gas which will always be clean and can be selected for optimum efficiency of pumping and support. The rotor is provided with internal truncated cone shaped surfaces disposed in spaced relation with conical bearing surfaces of a support member. The bearing surfaces of the support member is provided with a plurality of spiral grooves disposed in communication with the passages (opening) between the rotor and support member. These passages communicate with a plurality of passages between the gyro outer housing and inner cylinder to receive the gas therefrom for support of the rotor. The inner cylinder is also supported on gas disposed in passages provided between the outer housing and inner cylinder.

SUMMARY OF THE INVENTION

The gyro of the present invention includes an external housing enclosing an inner cylinder having the gyro rotor carried therein. The rotor is supported on a pair of support members having conical surfaces provided with spiral grooves therein. Each support member is provided with a configuration of a truncated cone. A gas is carried in sealed relation in the housing for hydrodynamic support therein of the inner cylinder and rotor. The gas may be any of many types available. However, air is preferable. A plurality of passages direct the gas between the outer housing and inner cylinder, and the conical support and the rotor. The spiral grooves in the support members provide a pumping action for the gas flow thereover to direct the gas through the passages. Thus, the gyro spin-motor provides the energy to not only rotate the rotor but to also provide self-pressurization of the system.

It is, therefore, an object of the present invention to provide a gaseous bearing gyro having no external source of pressurization.

It is another object of the present invention to provide an air bearing gyro which is hermetically sealed against all environments.

It is still another object of the present invention to provide such a gyro with hydrostatic support means which provide self pressurization.

These and other objects of the present invention will be more readily apparent from the following description and drawings:

DESCRIPTION OF THE PREFERRED EMBODIMENT

Figure 1:
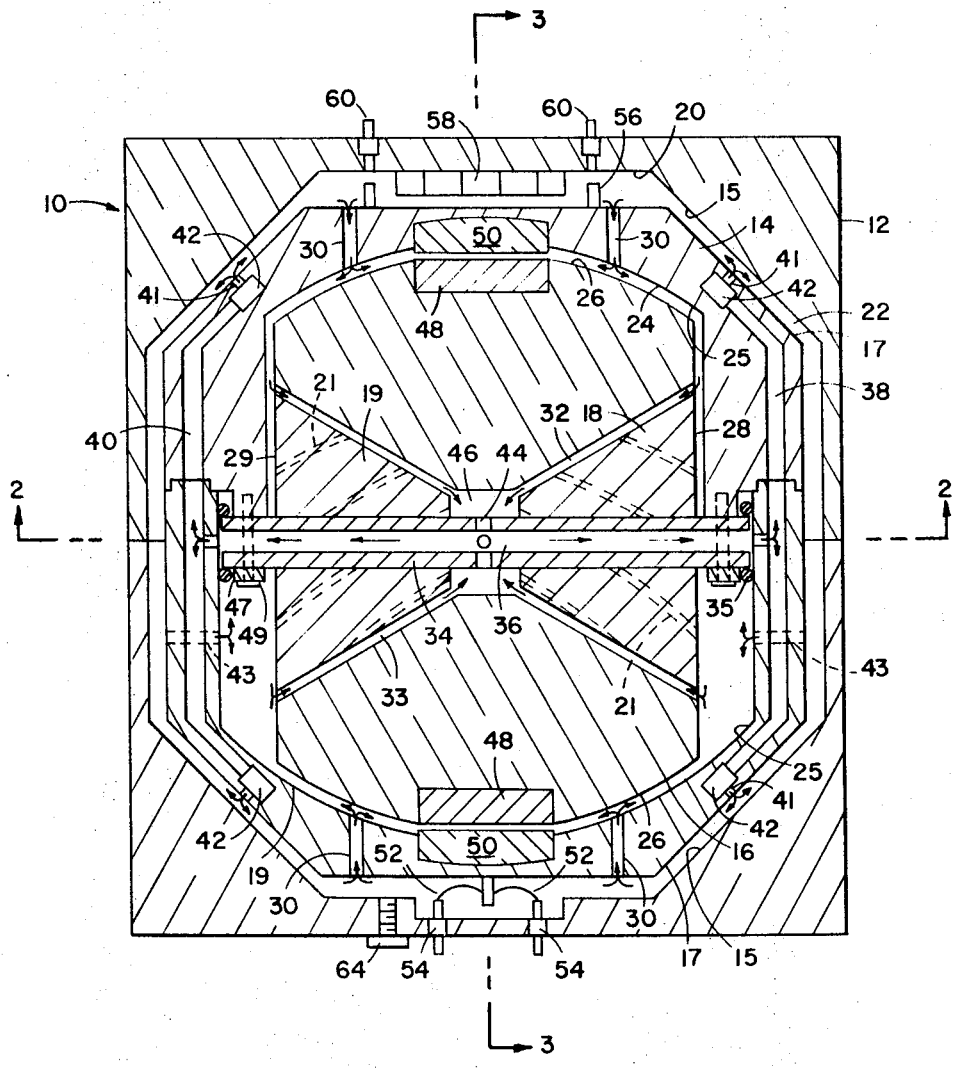
FIG. 1 is an elevational sectional view of the hydrostatic supported gyro of the present invention.

As shown in FIG. 1, a gyro 10 is provided with an external housing 12, having an inner cylindrical member 14 therein. An annular rotor 16 is carried in cylindrical member 14 in spaced relation with a pair of spaced conical support members 18 and 19 having spiral grooves 21 therein.

Cylindrical member 14 is disposed in spaced relation with an inner surface 20 of outer housing 12, to provide a chamber 22 therebetween. A second chamber 24 is provided between an inner surface 25 of cylindrical member 14 and the outer surface 26 of rotor 16 and outer surfaces 28 and 29 of conical support members 18 and 19, respectively.

Figure 3:
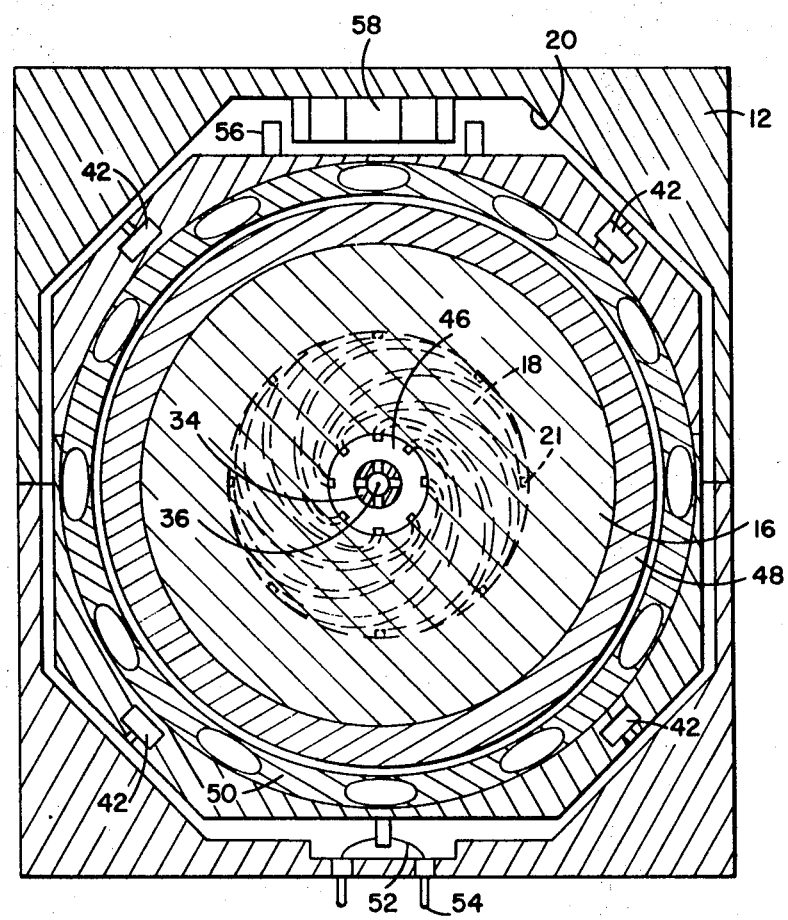
FIG. 3 is a sectional view along line 3—3 of FIG. 2.

As seen in FIGS. 1 and 3, the inner surface of the housing 12 and outer surface of the cylindrical member 14 includes annular portions 15 and 17 respectively which are disposed at substantially a 45° angle. The structure of such bearing surfaces are disclosed in Pat. No. 3,247,725, issued Apr. 26, 1966, to James V. Johnston, for Symmetrical Compliance Air Bearing Gyro.

A plurality of ports 30 is provided in the upper and bottom portions of cylindrical member 14 for communication between chambers 22 and 24. Ports 30 are disposed in substantially normal relation to the rotor spin axis. Rotor 16 is disposed in spaced relation with conical support members 18 and 19 to provide a pair of annular passages 32 and 33 between the conical support members and the rotor. Passages 32 and 33 communicate with chamber 24. A hollow shaft 34 is secured to inner cylindrical member 14 and is secured to conical support members 18 and 19 for support thereof in a pair of conical openings in the rotor. A passage 36 is provided through hollow shaft 34 for communication with the interior of a pair of passages 38 and 40 which are disposed in substantially normal relation with shaft 34 and extending therefrom to terminate in a pair of annular manifolds 42. Each manifold is provided with a plurality of orifices 41 which communicate with chamber 22. Hollow shaft 34 is provided with openings or ports 44 communicating with the interior thereof and into a chamber 46 between conical members 18 and 19, which in turn communicates with passages 32 and 33 between the rotor and conical members. A plurality of ports 43 provided in cylinder 14, communicate between passages 22 and 24 and are spaced around the cylinder so as not to interfere with passages 38 and 40.

Figure 2:
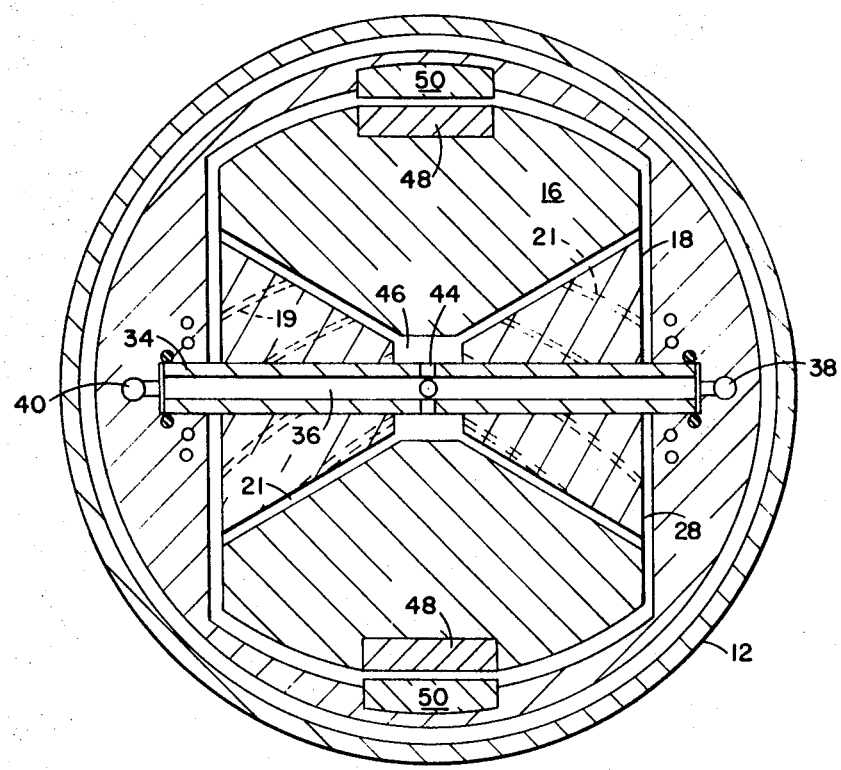
FIG. 2 is a sectional view along line 2—2 of FIG. 1.

As shown in FIGS. 1 and 2, rotor 16 is provided with a hysteresis ring 48 impressed therein and wound coils 50 of the motor stator is secured in inner cylinder 14. Power is brought to motor windings 50 through flex leads 52, which extend through hermetically sealed glass feed throughs 54 provided in the bottom portion of housing 12.

The output of the gyro is equipped with a standard microsyn system as is found in many gyros. The microsyn provides capability of sensing rotation of the output axis of the gyro while at the same time providing inductive coupling so that the output axis can be caused to move electrically. The microsyn torquer system includes a permanent magnet 56 attached to the upper portion of inner cylinder 14 and an armature winding 58 attached to housing 12. Hermetically sealed feed throughs 60 permit electrical connection to the armature winding 58.

A sealing plug 64 is provided in housing 12 so that the inner portion of the gyro can be evacuated and filled with any particular gas to a desired pressure for optimum operation.

In operation, the gyro is charged with a chosen gas at a desired pressure and sealing plug 64 is installed to prevent gas leakage. The injected gas would be retained in passages 32, 36, 38, and 40, chambers 22, 24 and 46, orifices 42, and ports 30 and 44.

As seen in FIGS. 1, 2 and 3, gas directed from hollow shaft 34 through passages 38 and 40 to manifolds 42 and through orifices 41 to passage 22 to support the entire inner cylinder assembly. Gas is then directed, through ports 30 and 43 to chamber 24 and passages 32 and 33 for hydrostatic support of the rotor in the hydrostatically supported cylindrical member. Gas then flows from passages 32 and 33 to chamber 46 and to the interior passage 36 of shaft 34 through ports 44. Shaft 34 is sealed to the inner cylindrical member by O-rings 35. A saddle clamp 47 is secured to cylindrical member 14 by bolts 49 to secure shaft 34 to cylindrical member 14.

It should be obvious, from the foregoing that applicant has provided an hermetically sealed gyro having a self-generating hydrostatic support for its output axis which does not require an external pressure system needing pumps, filters, driers and cumbersome tubing to the gyro housing.

When the rotor is spun-up the spiral grooves 21 of conical members 18 and 19 provide a pumping action for the gas that is contained in the gyro housing. After the gas exhausts through orifices 41, it returns back to ports 30 and 43 so that it can be brought back through the hydrodynamic pump for continued circulation through the gyro assembly.

I claim:

1. A gyro having a self-generating hydrostatic support comprising:
  (a) A housing enclosure having a fluid therein;
  (b) an inner cylinder member mounted in said housing in spaced relation with the inner surface thereof;
  (c) a rotor mounted in said inner cylinder and having its outer surface disposed in spaced relation with the inner surface of said cylinder member;
  (d) support means including a pair of truncated conical members mounted in said rotor in spaced relation therewith and provided with hydrostatic pumping means including a plurality of spirally disposed grooves on the outer surfaces thereof for pumping said fluid through said housing to provide hydrostatic support of said rotor and said inner cylinder member therein responsive to rotation of said rotor; and
  (e) a hollow shaft having its ends secured to said cylindrical member and disposed for support of said support means in said rotor.

2. A gyro as set forth in claim 1 wherein said spacing between the outer surface of said cylindrical member and said housing defines a first chamber therebetween and said spacing between said rotor and inner surface of said cylindrical member defines a second chamber therebetween.

3. A gyro as set forth in claim 2, wherein said cylinder member is provided with a pair of passages therethrough, each passage disposed at opposite ends of said hollow shaft in communication with the interior thereof, manifold means disposed at the ends of each said passage, and a plurality of orifices communicating with said manifold means and said first chamber.

4. A gyro as set forth in claim 3 wherein said cylindrical member is provided with a plurality of ports therethrough in communication with said first and second passages for flow of said gas therebetween.

5. A gyro as in claim 4 wherein said spacing between said rotor and said support member defines a pair of annular passages therebetween in communication one with the other and with said second chamber.

6. A gyro as in claim 5 wherein said axial spacing between said conical members defines a third chamber said third chamber disposed in communication with said hollow shaft passage and said annular passages between said rotor and said conical shaped members for directing gas flow from said annular passages to said hollow shaft passage.

7. A gyro as set forth in claim 6 wherein said manifold means includes a pair of annular passages disposed in said cylindrical member at opposite ends of said passages therein.

References Cited

UNITED STATES PATENTS

| | | | |
|---|---|---|---|
| 2,688,805 | 9/1954 | Annen | 74—5.7X |
| 2,809,527 | 10/1957 | Annen | 74—5.7 |
| 3,194,613 | 7/1965 | Pierry et al. | 308—9 |
| 3,257,854 | 6/1966 | Schneider et al. | 74—5.7 |
| 3,365,958 | 1/1968 | Bard et al. | 74—5.7X |
| 3,394,596 | 7/1968 | Wehde et al. | 74—5 |
| 3,482,454 | 12/1969 | Speer et al. | 74—5 |
| 3,522,737 | 8/1970 | Brenot | 74—5.7 |

MANUEL A. ANTONAKAS, Primary Examiner

U.S. Cl. X.R.

74—5.7